C. M. AYRES.
TROLLEY TRACK SAFETY SWITCH.
APPLICATION FILED AUG. 4, 1910.
981,237.
Patented Jan. 10, 1911.
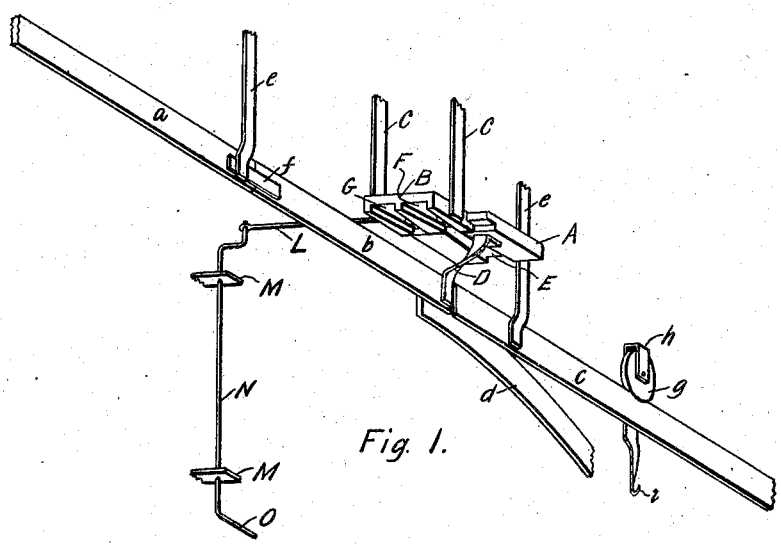
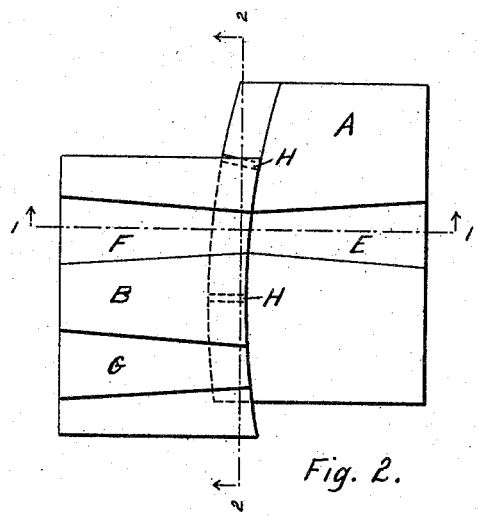
Fig. 2.
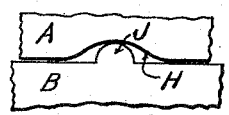
Fig. 5.
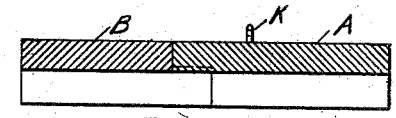
Fig. 3.
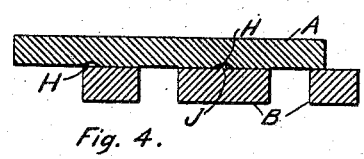
Fig. 4.
WITNESSES:
E. O. Gibbons
J. R. Gedrow
INVENTOR:
Clarence Morton Ayres
BY Eugene Ayres,
ATTORNEY
THE NORRIS PETERS CO., WASHINGTON, D. C.

UNITED STATES PATENT OFFICE.

CLARENCE MORTON AYRES, OF TUSCALOOSA, ALABAMA.

TROLLEY-TRACK SAFETY-SWITCH.

981,237. Specification of Letters Patent. Patented Jan. 10, 1911.

Application filed August 4, 1910. Serial No. 575,493.

*To all whom it may concern:*

Be it known that I, CLARENCE MORTON AYRES, a citizen of the United States, residing at Tuscaloosa, in the county of Tuscaloosa and State of Alabama, have invented certain new and useful Improvements in Trolley-Track Safety-Switches, of which the following is a specification.

My invention relates to improvements in switches for over head trolley tracks in which two over-lapping blocks having guide grooves cut in their under sides prevent the trolley from passing off or on to the switch point until it is correctly set.

I accomplish my object by the mechanism illustrated in the accompanying drawings, in which,—

Figure 1 is a perspective view from below of a portion of a trolley track, its switch and the switch blocks assembled; Fig. 2 is a bottom view of the switch blocks; Fig. 3 is a section of the switch block through line 1—1, shown in Fig. 2; Fig. 4 is a section of the switch block through line 2—2, shown in said Fig. 2, and Fig. 5 is an enlarged end view of a keeper groove and ridge.

Similar letters of reference indicate corresponding parts in the several figures of said drawings.

A is the forward or top switch block.
B is the rearward or bottom switch block.
C C are the hangers for block B.
D is the hanger that attaches block A to the switch point.
E is the groove in block A.
F is the main track groove in block B.
G is the side track groove in block B.
H H are the keeper grooves in block A.
J is the keeper ridge on block B.
K is the eyehole by which switch rod L is attached to block A.
M M are any convenient supports or journal boxes for switch throw rod N, and O the handle on said rod N.
*a* is a portion of a trolley track.
*b* is the switch point of the trolley track which may, if the track is made of stiff material, be connected to said portion of a trolley track *a* by a spring steel splice plate *f*.
*c* is the main track beyond the switch and *d* the side track.
*e e* are the track hangers.
*g* is a trolley wheel and *h* the trolley wheel hanger.
*i* is a hook at the bottom of said hanger by means of which the load is attached to the trolley. As shown in Fig. 1 the switch is set to pass trolleys from track *a* to track *c*. The grooves E and F are directly in line, as shown also in Fig. 2. To set the switch for the side track *d* block A should be pulled to the left, as shown in Fig. 1. This may be done by means of the throw L N O, as shown in Fig. 1, or in any other way that the designer may prefer. The point of the switch *b* being rigidly connected to block A by hanger D, when the block A is moved to the left the point of the switch is carried with it so that when groove E comes in line with groove G then the point of switch *b* will be in line with side track *d*. This is accomplished by making the distance center to center of grooves F and G equal to the distance center to center, at the switch points, of tracks *c* and *d*. The guide grooves E, F and G are made nearly the width at the point of switch of the trolley hanger *h* and given a slight flare away from the point, as shown in Figs. 1 and 2.

When the trolley approaches the switch over track *c* if the switch is not thrown to exactly the right position then the hanger *h* may still enter the groove E and crowd the block A and therefore the switchtrack *b* into position. Or if the approach is made from track *a* then the hanger *h* may enter into groove F and crowd switch *b* and therefore block A into position. When the switch and grooves fail to line up by more than half the width of the flare then the hanger *h* will buffer against the ends of the block A or B and prevent the trolley from passing until the switch is correctly thrown. This makes it absolutely impossible to run a trolley off the end of any track at the switch. The block B could be made with three or more grooves to serve as many tracks if so desired. In practice it is found that the several parts of the throwing device wear so that block A is not held rigidly in place and may jar from side to side, making it necessary for the trolley to crowd the grooves into line. The friction of the trolley against the sides of the grooves reduces the speed of the trolley. To overcome this I have added to the device the keeper grooves H H cut in block A and the ridge J on block B. When the switch is thrown to the correct position groove H drops over ridge J, as shown in Fig. 5, and prevents the jarring of the blocks out of position by the weight of the block A holding groove H down firmly over ridge J. The edges of the groove H are slightly convexed so as to assist the displacement when it is desired to throw the switch.

What I claim and desire to secure by Letters Patent, is:—

1. The combination in a trolley switch of a forward top switch block having a groove in its under side and means for attaching switch throw apparatus, a rearward bottom block having grooves in its under side corresponding to the main and side tracks, the top block having keeper grooves and a keeper ridge in the bottom block to engage with said grooves in the top block.

2. In a trolley switch mechanism, in combination with main and branch trolley tracks, a grooved top forward block and a corresponding grooved bottom rearward block fitted with a ridge and groove to keep the same in place and a suitable operating device connected to the top forward block.

3. The combination of a rigidly hung bottom rearward block having grooves in its under surface corresponding to the main and side trolley tracks and a top forward block rigidly connected to and over the movable switch point and having a groove in its under surface.

4. The combination of a rigidly hung bottom rearward block having grooves in its under surface corresponding to the main and side trolley tracks and a top forward block rigidly connected to and over the movable switch point and having a groove in its under surface, said grooves in both blocks to be wider in either direction from the switch point to allow the moving trolley by a side pressure on the grooves to correct small errors of alinement in the switch point.

5. In combination a main and side track, a switch point flexibly connected to the main track, a top forward block rigidly connected to said switch point, a bottom rearward block rigidly hung over the main and side tracks, said blocks having grooves in the under sides so placed as to permit the passing of the trolley except when the switch is correctly thrown.

6. The combination of a rigidly hung bottom rearward block having grooves in its under surface corresponding to the main and side trolley tracks and a top forward block rigidly connected to and over the movable switch point and having a groove in its under surface, the bottom of said grooves being set high enough above the trolley track to clear the trolley wheel hanger and the depth of said grooves such that the bottom faces of the blocks are close enough to prevent the trolley passing under them.

In testimony whereof I affix my signature in presence of two witnesses.

CLARENCE MORTON AYRES.

Witnesses:
C. H. BLACKLOCK,
C. E. MORRIS.